US009425631B2

(12) United States Patent
Furtner (10) Patent No.: US 9,425,631 B2
(45) Date of Patent: Aug. 23, 2016

(54) SYSTEM AND METHOD FOR BATTERY MANAGEMENT (75) Inventor: Wolfgang Furtner, Fuerstenfeldbruck (DE)

(73) Assignee: Infineon Technologies Austria AG, Villach (AT)

( * ) Notice: Subject to any disclaimer, the term of this patent is extended or adjusted under 35 U.S.C. 154(b) by 1215 days.

(21) Appl. No.: 13/405,970

(22) Filed: Feb. 27, 2012

(65) Prior Publication Data
US 2013/0221926 A1 Aug. 29, 2013

(51) Int. Cl.
*H02J 7/00* (2006.01)
*G06F 1/26* (2006.01)

(52) U.S. Cl.
CPC .............. *H02J 7/0019* (2013.01); *G06F 1/263* (2013.01); *H02J 7/0018* (2013.01)

(58) Field of Classification Search
CPC ........ G06F 1/263; H02J 7/0018; H02J 7/0019
USPC .................................................. 320/128, 129
See application file for complete search history.

(56) References Cited

U.S. PATENT DOCUMENTS

| 7,489,109 | B1 | 2/2009 | Qian et al. | |
|---|---|---|---|---|
| 7,719,236 | B2 | 5/2010 | Hartular | |
| 8,248,230 | B2 * | 8/2012 | Covaro | H02J 13/0003 340/12.32 |
| 2004/0113585 | A1 * | 6/2004 | Stanesti | H02J 7/0018 320/116 |
| 2009/0278497 | A1 * | 11/2009 | Kim | H02J 7/0019 320/126 |
| 2011/0133556 | A1 * | 6/2011 | Choi | H02J 3/383 307/65 |
| 2012/0062038 | A1 * | 3/2012 | Wang | H02J 7/0018 307/82 |
| 2012/0274145 | A1 * | 11/2012 | Taddeo | H02J 1/12 307/82 |
| 2013/0076310 | A1 * | 3/2013 | Garnier | H02J 7/0016 320/118 |

FOREIGN PATENT DOCUMENTS

| CN | 200941561 Y | 8/2007 |
|---|---|---|
| CN | 101986508 A | 3/2011 |

OTHER PUBLICATIONS

First Office Action received in 201310061330.7, mailed Sep. 18, 2014, 35 pages (English Translation).
Li et al., "Development of Bi-Directional DC-DC Converter in Multiple Battery Energy Storage System," Power System Protection and Control, vol. 39, No. 3, Feb. 1, 2011, pp. 90-94.

* cited by examiner

*Primary Examiner* — Nathaniel Pelton
(74) *Attorney, Agent, or Firm* — Slater Matsil, LLP (57) ABSTRACT

In accordance with an embodiment, a bi-directional charging circuit has a battery coupling node output configured to be coupled to a battery cell, an input coupled to a common node of the battery management system, and a controller coupled to the bi-directional charging circuit. The controller is configured to operate the bi-directional charging circuit in a charging mode to transfer charge from the common node to the battery coupling node, and operate the bi-directional charging circuit in a discharge mode to transfer change from the battery coupling node to the common node.

23 Claims, 11 Drawing Sheets

PRIOR ART

*FIG. 1a*

PRIOR ART

SYSTEM AND METHOD FOR BATTERY MANAGEMENT

TECHNICAL FIELD

An embodiment of the invention relates generally to electronic power conversion and methods, and more particularly to a system and method for a battery management.

BACKGROUND

Portable electronic devices such as laptops, tablet computers and personal multimedia devices are often configured to receive power from the AC/DC mains adapter or from an integrated battery pack. This integrated battery pack may contain multiple battery cells to provide sufficient power for the electronic device. During operation, battery cells are charged and discharged by a charging circuit. A protection circuit is often provided to protect the battery cells from improper use, for example, to prevent lithium-ion batteries from being overheated or overcharged. Furthermore, deeply discharging a lithium-ion battery may short-circuit the cell, thereby making a subsequent recharging of the cell unsafe.

Oftentimes, each individual cell within the battery pack may have a different charge capacity. This different charge capacity may be different intentionally by construction or through production tolerances and/or aging. For small capacity differences, balancing circuitry is often included in battery pack management circuits in order to mitigate the effects of different charge capacity and different charge and discharge rates for each particular battery in the battery pack. In many cases, cells with large capacity differences are only charged and discharged in parallel. To support this, battery management systems will often monitor the charge level of each battery, and perform battery management functions accordingly.

One of the consequences of different cells within the battery pack having different capacities is that the power supply bus has a high variation in operating voltage over the duration of a particular charge. Therefore, power system components, such as voltage regulators, are designed to operate over a very wide power supply voltage range. The efficiency of such voltage regulators, however, may decrease as the difference between the input voltage and regulated voltage increases.

SUMMARY OF THE INVENTION

In accordance with an embodiment, a bi-directional charging circuit has a battery coupling node output configured to be coupled to a battery cell, an input coupled to a common node of the battery management system, and a controller coupled to the bi-directional charging circuit. The controller is configured to operate the bi-directional charging circuit in a charging mode to transfer charge from the common node to the battery coupling node, and operate the bi-directional charging circuit in a discharge mode to transfer change from the battery coupling node to the common node.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a system and method for battery management. Embodiments of the present invention may also be applied to the management of power sources and to various electronic power conversion devices, such as switched mode power converter device.

Figure 1A:
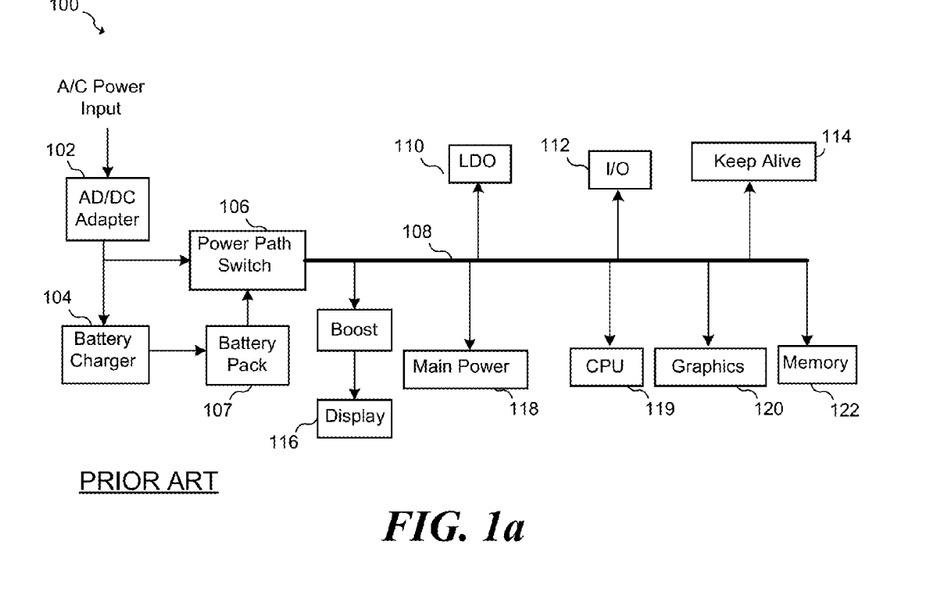
FIGS. 1a-b illustrate a conventional battery management system.

FIG. 1a illustrates conventional power supply management system 100 for a notebook computer. Power supply management system 100 includes AC/DC adapter 102, battery charger 104, power path switch 106 and battery pack 107. Power path switch 106 selects either battery pack 107 or AC/DC adapter 102 to supply power bus 108 with power. Battery charger 104 charges battery pack 107 using power from AC/DC adapter 102. In some cases, battery pack 107 may have more than one battery cell connected together in series. For example, battery pack 107 may have three cells connected together in series thereby yielding an output voltage of between about 9 V and about 12 V. In various embodiments, the output voltage may vary with respect to different battery chemistries. For example, in conventional Li-Ion batteries (LiCoO2), the lowest voltage is about 3.0 V per cell, the nominal voltage is about 3.6 V per cell, and the fully charged voltage is about 4.2 V per cell. Other chemistries may have other voltages. The three cells may output 9 V when the cells are in a low charge condition, and output 12.6 V when the three cells are fully charged. Four cells, for example, will produce an output voltage between about 12 V and about 16.8 V. Therefore, the voltage of supply power bus 108 may vary between 9 V, which represents the low-power condition of three cells coupled in series, and about 19 V, which represents the output of AC/DC adapter 102. There may also be AC adaptors that output a higher voltage such as 20 V, to provide a higher voltage to accommodate a fully charged battery stack plus extra headroom for regulation.

Power supply bus 108 may be coupled to various systems present within the notebook computer. For example, power bus 108 may be coupled to low dropout regulator 110, I/O power 112, keep alive circuit 114, LCD screen, 116, main power supply 118, CPU 119, graphics circuitry 120, and DRAM memory 122. These circuits may be coupled to power supply bus 108 via voltage regulators, low dropout regulators, or in the case of LCD screen 116, a voltage boosting circuit. In some cases, main power supply 118, CPU 119, graphics circuitry 120 and dynamic memory 122 may have the highest peak power consumption. It should be appreciated that the example shown in FIG. 1*a* is merely an example of one of many types of systems in which battery management devices are used.

Figure 1B:
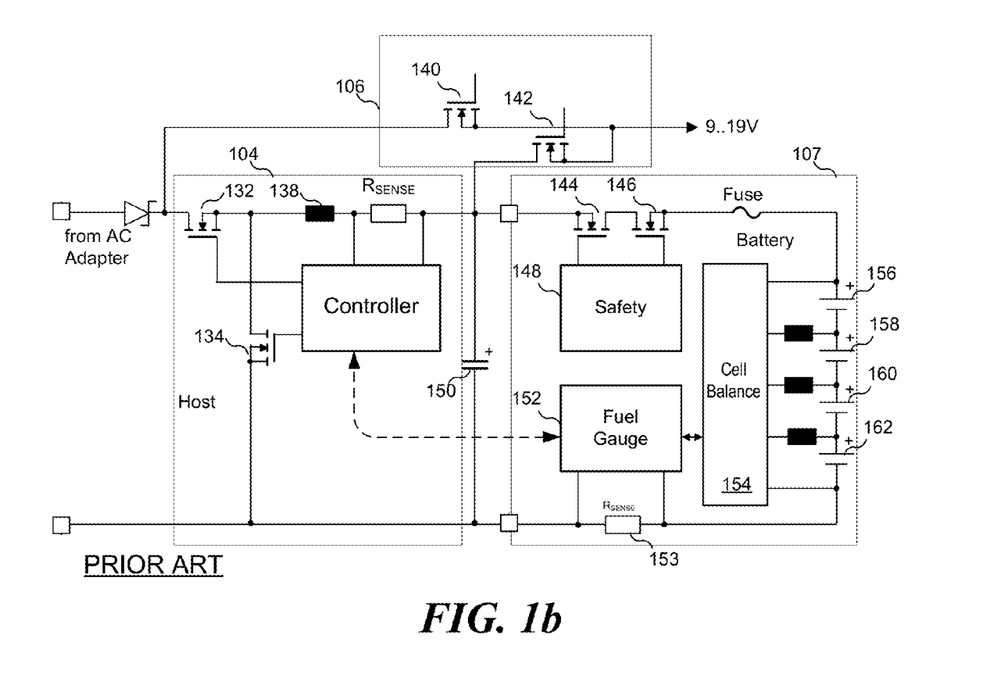

FIG. 1*b* illustrates details of battery charger 104, power path switch 106 and battery pack 107. Power path switch 106 includes transistors 140 and 142 that select between the output of battery pack 107 and the AC adapter. Battery pack 107 includes four battery cells 156, 158, 160 and 162 coupled in series. The battery pack also includes a fuse for first level fault protection and safety circuit 148 with bi-directional MOSFETs 144 and 146 for second-level fault protection. Fuel gauge 152 monitors the battery current via resistor 153 and individual cell voltages in order to track the charge status and maximum capacity of each battery cell.

Battery charger 104, which is activated when power bus 108 is receiving power from the AC power supply, includes a switching DC/DC converter having a series switching transistor 132 parallel switching transistor 134, inductor 138, series current path sensing resistor $R_{SENSE}$, and output capacitor 150. Battery charger 104 may also be implemented using a linear voltage regulator. Battery charger 104 generates charging currents and voltages that are required to charge the battery cells in battery pack 107. In the example of FIG. 1*b*, a single charger is responsible for charging all for battery cells 156, 158, 160 162. Here, the charge delivered to each of the cells in the string is equal. Because cells 156, 158, 160 162 may have different capacities, cell balancing circuit 154 is used to reshuffle charge between the cells.

Figure 2A:
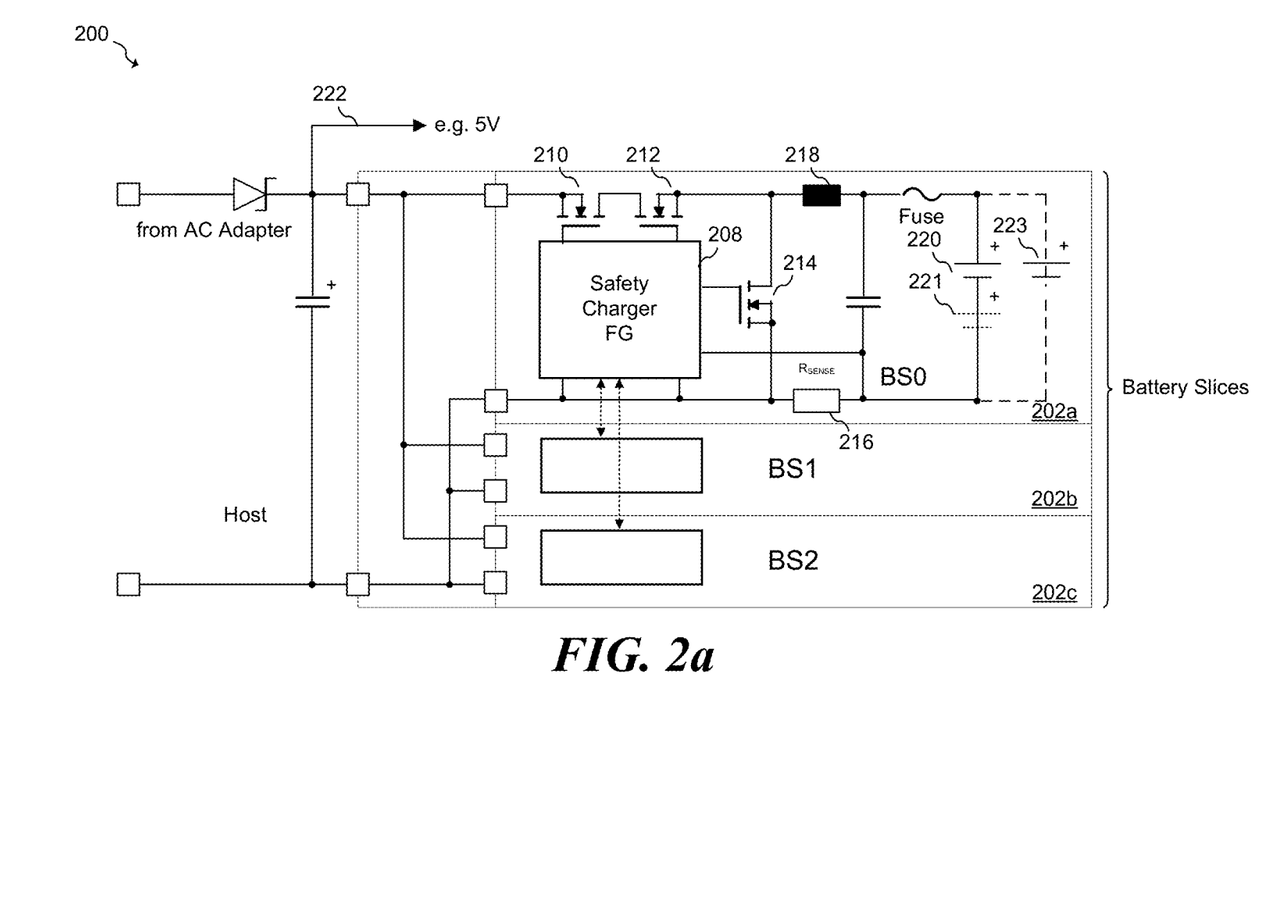
FIGS. 2a-g illustrate a battery management system according to an embodiment of the present invention.

FIG. 2*a* illustrates embodiment battery management system 200 according to an embodiment of the present invention. In an embodiment, a battery pack is divided into multiple slices 202*a*, 202*b*, and 202*c*. Each slice may include one cell 220 or multiple cells that are connected in series and/or parallel, such as optional cells 221 and 223. Each slice, for example, slice 202*a*, has its own charger, fuel gauge and safety circuit that is represented, for example, by controller block 208. Battery slices 202*b* and 202*c* may also contain similar circuitry as block 202*a*.

Battery slice 202*a* has controller 208 that operates series switches 210 and 212, as well as low side switch 214. The switches, along with inductor 218, form a bi-directional switched mode power converter. In an embodiment, battery management system 200 detects the presence of an AC adapter, for example by sensing an increased rail voltage. When system 200 detects this increased rail voltage, battery slices 202*a*, 202*b* and 202*c* are operated in a mode that transfers charge from power bus 222 into the respective battery cells coupled to each respective bi-directional switch mode power converter. During charging, switch elements 210, 212 and 214 are operated as a buck converter to decrease the voltage from the AC adapter output to a suitable cell voltage. In one embodiment, switching elements 210, 212 and 214 are implemented using MOSFET switches; however, these switches may be implemented in a different manner such as Bipolar transistors, IGBTs, Junction FETs, and other semiconductor switching devices. Inductor 218 is charged via high-side switches 210 and 212 and then discharged via low side switch 214 until the current reaches zero. In one embodiment that employs a quasi-resonant mode (QRM) of operation, inductor 218 is charged to a peak current of about two times the desired average charge current into battery cell 220. In alternative embodiments of the present invention, inductor 218 may be charged to a different ratio of the desired battery cell charge current. For example, in a continuous conduction mode (CCM) the ratio between the peak current for the inductor and the average battery cell charge current may be less than two, and in a discontinuous conduction mode, this ratio may be greater than two. Alternatively, other ratios may be used in various CCM, QRM and DCM modes. The operation of a single battery slice during charging mode is graphically illustrated in FIG. 2*b*.

In an embodiment, when the presence of the AC adapter is not sensed, battery slices 202*a*, 202*b* and 202*c* are operated in a discharge mode, such that energy from cell 220 is discharged to power bus 222.

When the presence of an AC adapter is not sensed, the cells within battery slices 202*a*, 202*b* and 202*c* are discharged to power bus 222 by operating switch elements 210, 212 and 214 and inductor 218 as a boost converter to increase the voltage from cell 202*a* to a desired rail voltage at power bus 222. In one embodiment, the voltage at power bus 222 is controlled to be about 5 V. Alternatively, power bus 222 may be controlled to achieve other voltages. Inductor 218 is charged via low side switch 214 up to a maximum current and then discharged via high-side switches 210 and 212 until the current reaches zero. In some embodiments that employs a quasi-resonant mode (QRM) of operation, this maximum current may be two times the discharge current from battery cell 220. In alternative embodiments of the present invention, inductor 218 may be charged to a different ratio of the desired battery discharge current. For example, in a continuous conduction mode (CCM) the ratio between the peak current for the inductor and the average battery cell discharge current may be less than two, and in a discontinuous conduction mode, this ratio may be greater than two.

Figure 2B:
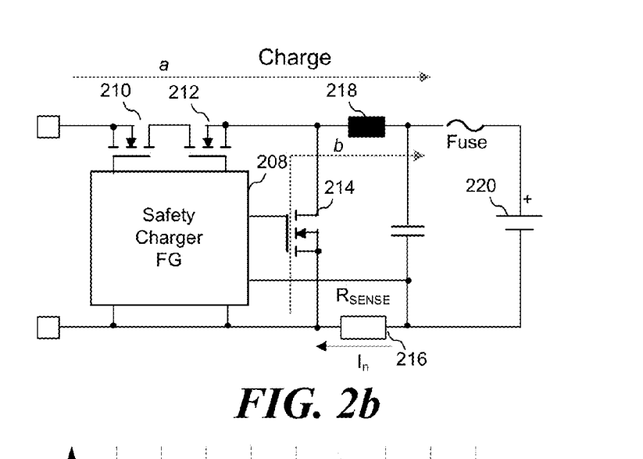
Figure 2C:
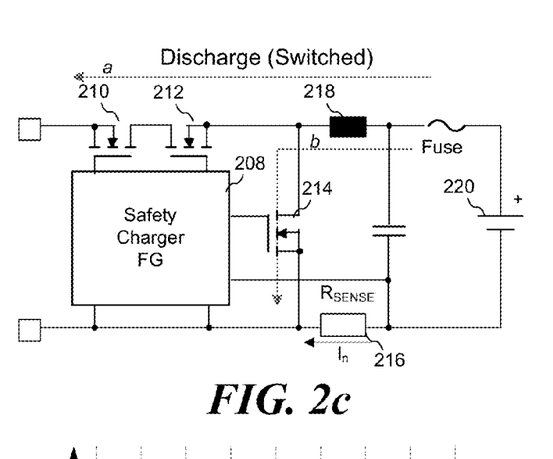

The operation of a single battery slice during discharging mode is graphically illustrated in FIG. 2*c*.

In an embodiment, slices 202*a*, 202*b* and 202*c* may operate in a phase interleaved mode in which the loading and supplying of power bus 222 is spread out within a 360° cycle for improved load response and reduced electromagnetic interference (EMI). In one embodiment, the loading and supplying of power rail 222 is interleaved by 360°/n, where n is the number of slices. In the illustrated embodiment of FIG. 2, n=3.

In an embodiment, the controllers of each individual slice may communicate with each other in order to align the phases for the interleaved operation. Slices 202*a*, 202*b* and 202*c* may also exchange data such as the maximum capacity of each slice in order to enable charge balancing for charging and discharging operations. Moreover, slices 202*a*, 202*b* and 202*c* may synchronize their DC/DC conversion for improved load response. In alternative embodiments of the present invention a single integrated controller may be used to control switches within the multiple battery slices.

Figure 2D:
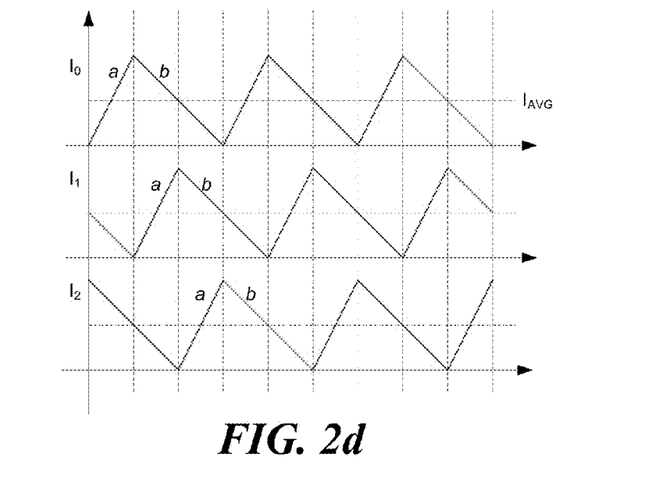
Figure 2E:
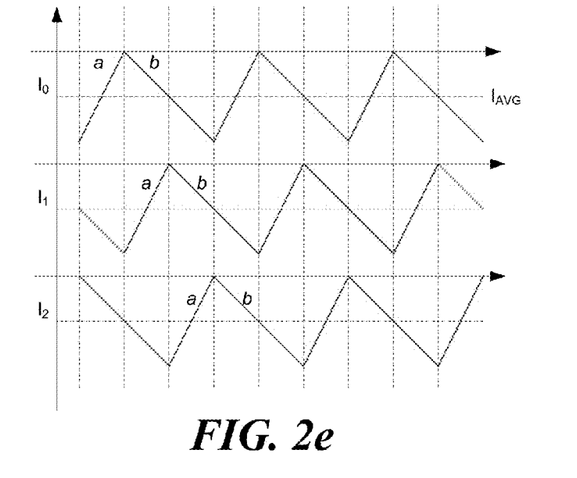

FIG. 2*d* illustrates the charging operation of embodiment battery management system 200 (FIG. 2), as shown by the schematic of FIG. 2*b*. Current $I_0$ represents the charging current of battery slice 202*a*, current $I_1$ represents the charging current of battery slice 202*b*, and current $I_2$ represents the charging current of battery slice 202*c*. FIG. 2*e*, on the other hand, illustrates the discharging operation embodiment battery management system 200, as shown by the schematic of FIG. 2c. As shown in FIGS. 2d and 2e, currents $I_0$, $I_1$ and $I_2$ are phased such that each charging current is arranged to be 360°/3=120° apart from each other. In alternative embodiments, the phasing relationship between $I_0$, $I_1$ and $I_2$ may be staggered differently, or some or all currents may be in-phase with each other. Waveform portions labeled "a" indicate current flowing through high side switches 210 and 212, and waveform portions labeled "b" indicate current flowing through low side switch 214.

Figure 2F:
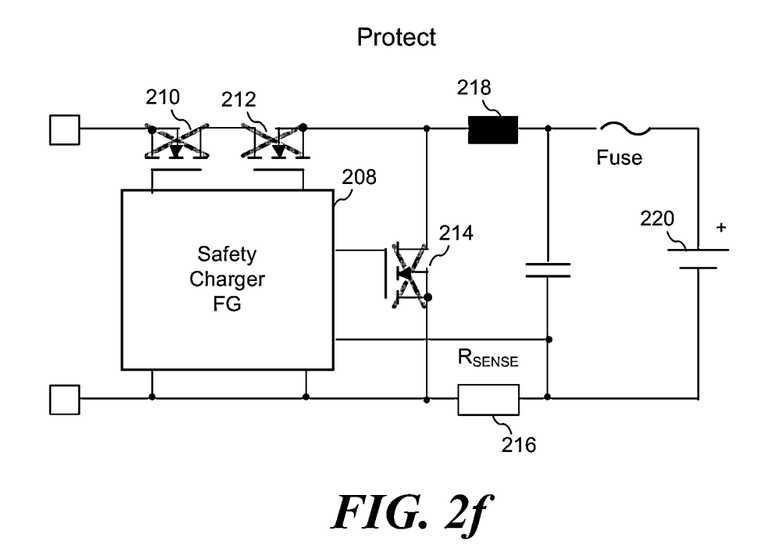

FIG. 2f illustrates a protection mode for battery slice 202a. In the protection mode, switch elements 210, 212 and 214 are shut off to prevent both charging and discharging of cell 220. In some embodiments, only one of switches 210 and 212 are disabled. The embodiment protection mode illustrated in FIG. 2f may be used, for example, in systems that employ lithium-ion cells. In an embodiment, the protection mode is activated by controller 208 to prevent an overvoltage, over charge current, over discharge current, or over temperature on the lithium ion cells that may lead to the lithium ion cells being damaged, destroyed, and/or overheated.

Figure 2G:
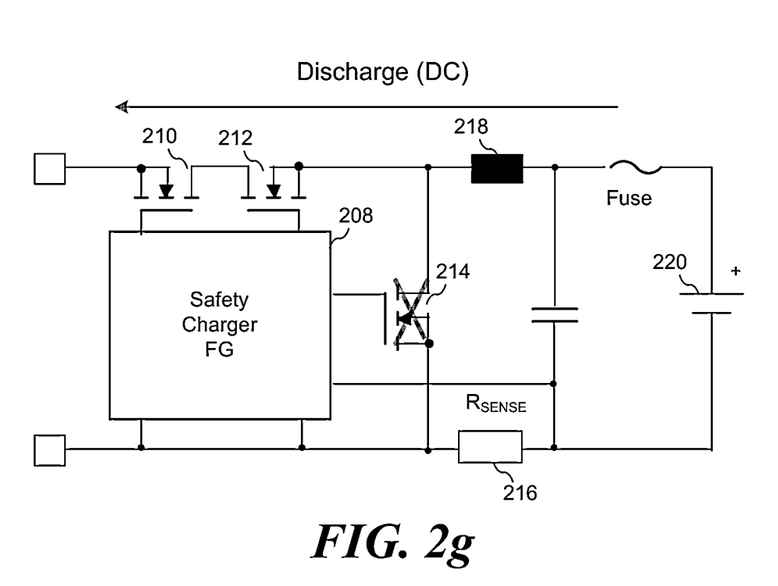

FIG. 2g illustrates a discharge mode for battery slice 202a, in which switching transistors 210 and 212 are permanently closed and switching transistor 214 is permanently open in order to enable discharge of battery cell 220. The embodiment discharge mode may be activated, for example, to avoid switching losses and/or when no battery voltage conversion is desired. In this mode, the power bus voltage may be close to the battery voltage.

Figure 3:
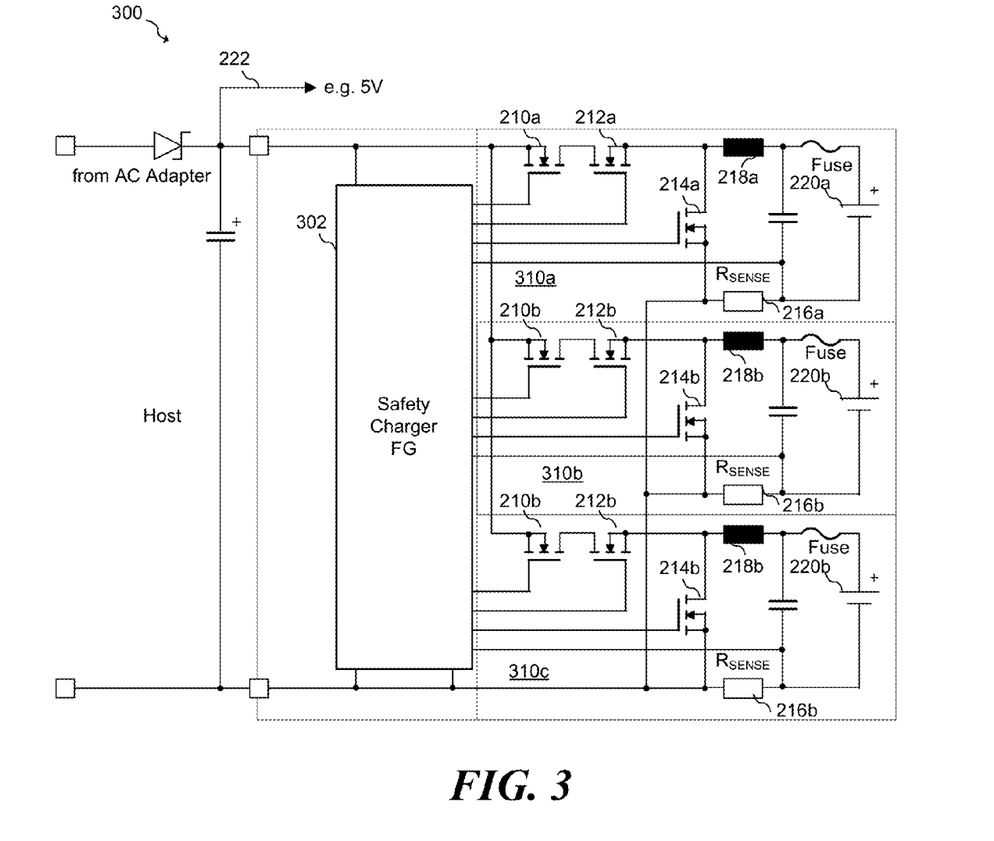
FIG. 3 illustrates a battery management sys tem according to another embodiment using a single controller.

FIG. 3 illustrates battery management system 300 according to an alternative embodiment of the present invention, in which a single control unit 302 is used to provide control signals to slices 310a, 310b and 310c. Charging unit 302 may be disposed on a single integrated circuit or on multiple integrated circuits. By including control unit 302 on one integrated circuit, sharing of resources such as some I/O pins or a central controller circuit may be accomplished, thereby easing communication between the slices. Control unit 302 may also include discharge control, safety functionality, a fuel gauge and circuitry to supply other functionality. Moreover, in some embodiments, switching elements 210, 212 and 214 may be entirely or partially integrated with controller 302.

Figure 4:
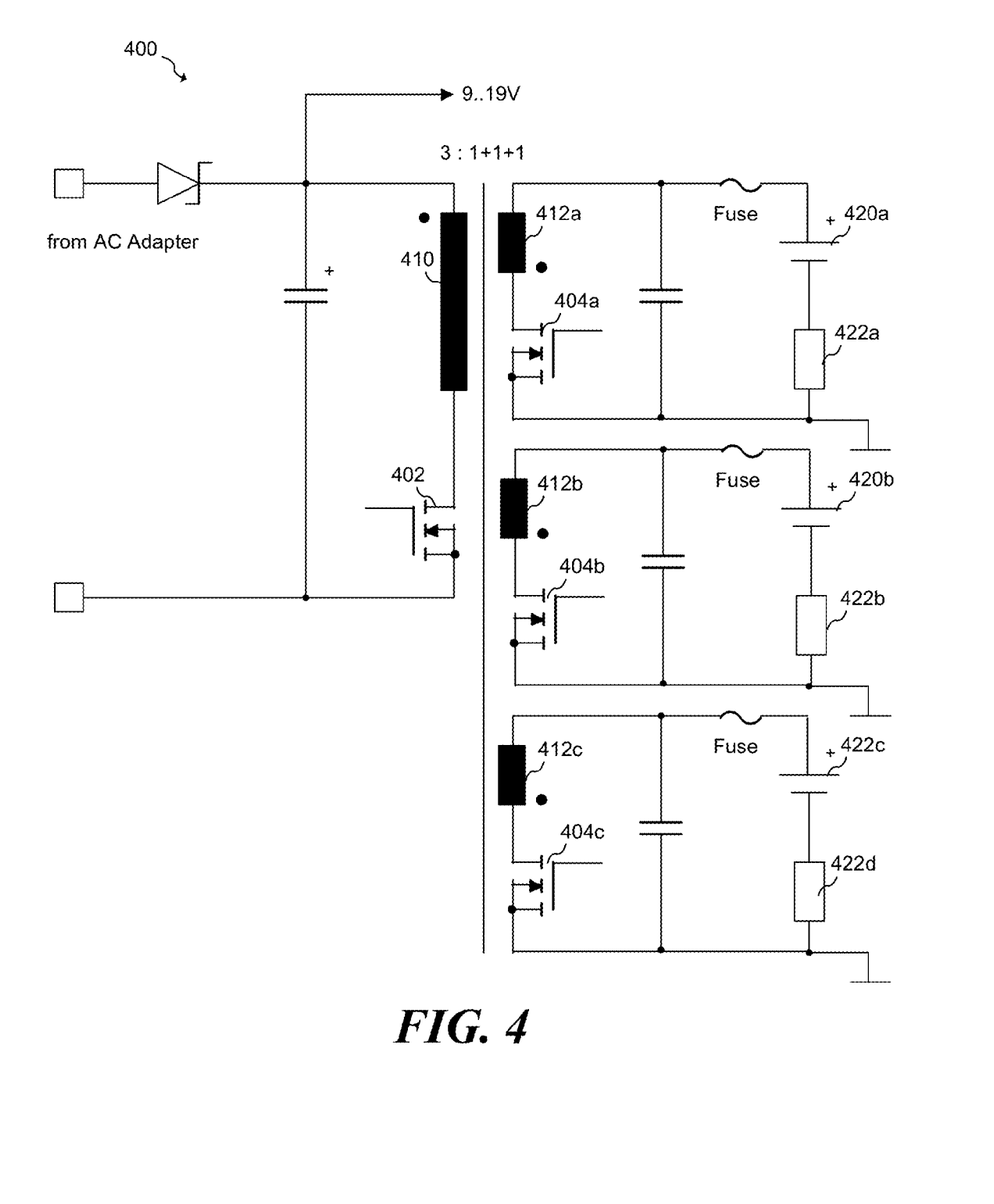
FIG. 4 illustrates a battery management system according to a further embodiment.

FIG. 4 illustrates battery management system 400 according to an alternative embodiment of the present invention, in which battery cell slices are coupled to the AC power supply via a plurality of transformer coupled flyback converter. Battery management system 400 has three battery slices including battery cells 420a, 420b in 420c, which are coupled to primary winding 410 via secondary windings 412a, 412b, and 412c. Low side switching transistors 402, 404a, 404b and 404c are provided control signals from a controller (not shown) that sequence the switches in a manner that allows for either charging or discharging battery cells 420a, 420b, and 420c. It should be further appreciated, that other power conversion architectures may be employed in alternative embodiments of the present invention, for example, SEPIC, Split-Pi, Cuk, half-bridge, full-bridge, LLC, and other architectures. Resistors 422a, 422b and 422c may be used by the controller (not shown) for current measurement purposes.

Figure 5A:
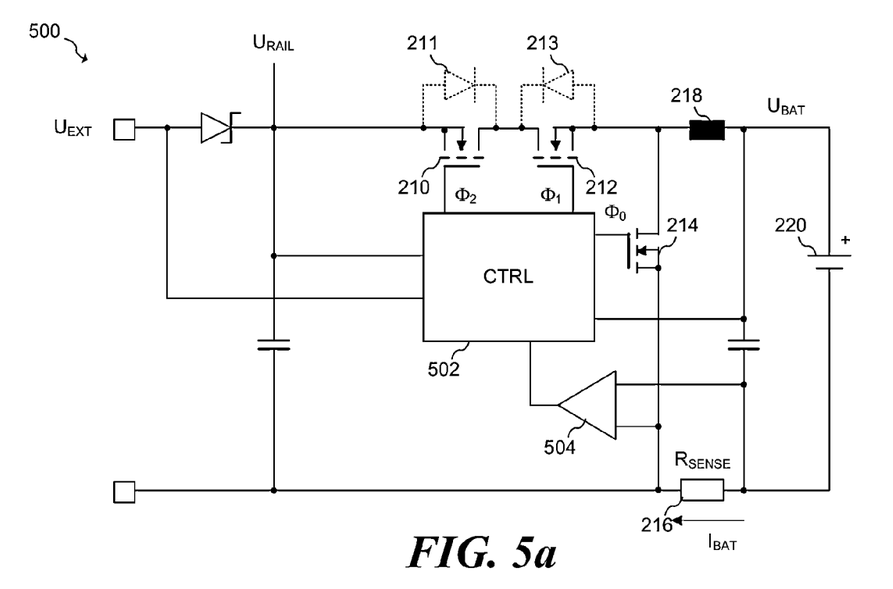
FIGS. 5a-c illustrate an embodiment battery slice and a waveform diagram illustrating the operation of the embodiment battery slice.
Figure 5B:
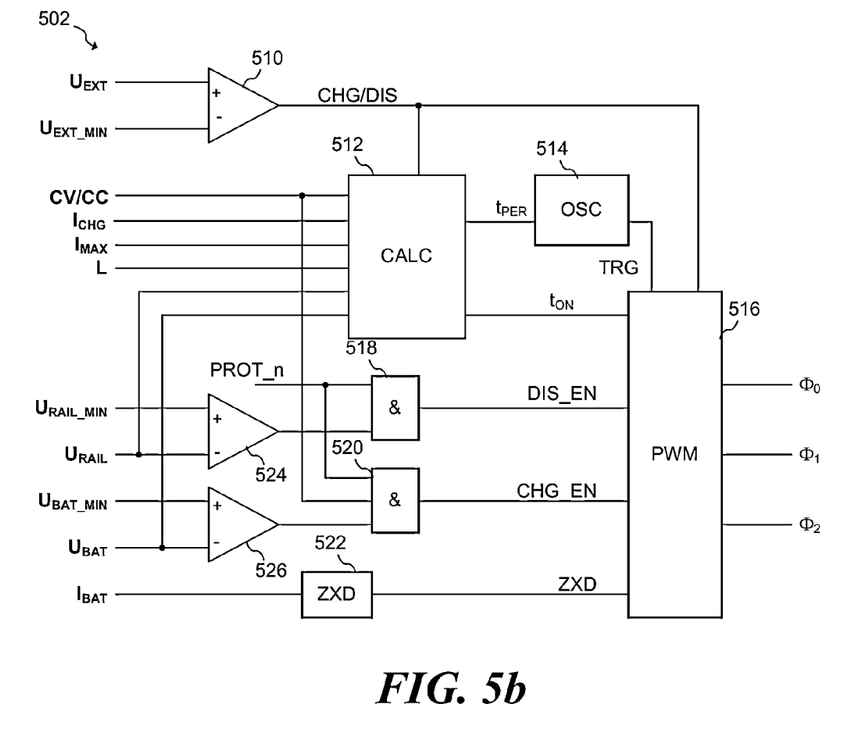
Figure 5C:
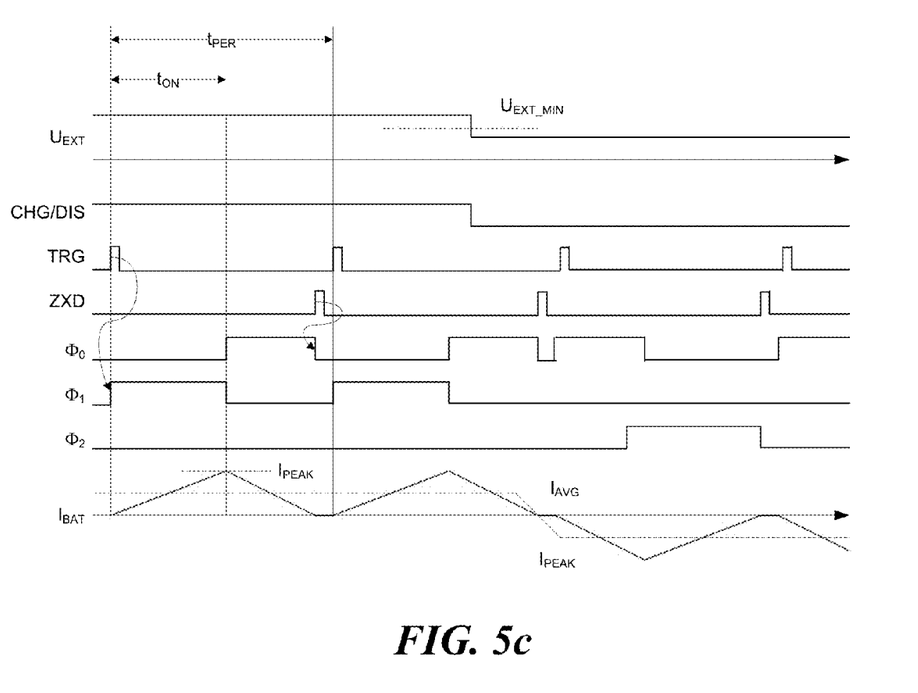

FIGS. 5a-c illustrate a single bi-directional power supply slice according to an embodiment of the present invention. It should be understood that multiple slices of the embodiment shown in FIG. 5a may be combined to form a single embodiment battery management system. Furthermore details of the operation of the power supply slice may be applied to embodiments having a single controller that operates multiple battery slices.

FIG. 5a illustrates battery cell 220 coupled to a bi-directional switched mode power supply slice 500 having control circuit 502, high-side switching transistors 210 and 212, low side switching transistor 214, and series inductor 218. Bi-directional switched mode power supply slice 500 also has amplifier 504 which, in concert with current sensing resistor 216, serves to create a voltage or current proportional to the voltage across resistor 216, which provides an indication of the charge or discharge current of battery cell 220. Control circuit 502 further has an input coupled to voltage $U_{BAT}$, which provides a voltage feedback path to control circuit 502. The outputs of amplifier 504 and voltage $U_{BAT}$ may be used to provide feedback to control voltage $U_{BAT}$ during charging and voltage $U_{RAIL}$ during discharging. In an embodiment, switching transistors 210 and 212 are connected drain-to-drain such that their body parasitic diodes 211 and 213 have opposing polarities, which allows for bi-directional current control in embodiments that employ MOSFET switches.

FIG. 5b illustrates embodiment control circuit 502. Control circuit 502 has comparator 510 that compares external AC power supply input $U_{EXT}$ with reference voltage $U_{EXT\_MIN}$. In one embodiment, when the voltage $U_{EXT}$ is greater than a minimum allowed AC adapter output voltage, for example, 5V, the battery power management system is placed in a charging mode, where battery cell 220 is charged. On the other hand, if voltage $U_{EXT}$ is less than the minimum power bus voltage, for example, 4.75V, the battery power management system is placed in a discharge mode, where battery cell 220 supplies the system at voltage $U_{RAIL}$. In alternative embodiments of the present invention, other threshold voltages may be used depending on the particular application and its specifications.

In an embodiment, calculation block 512 determines period $t_{PER}$ of oscillation (or pulse frequency) and pulse width $t_{ON}$ of the switching signals used to control the current at which battery 220 is charged or discharged. If signal CV/CC is in a first state, for example, HIGH, battery slice 500 operates in a constant voltage mode in which the battery is presented with a constant voltage during charging. If signal CV/CC is in a second state, for example LOW battery slice 500 operates in a constant current mode. In some embodiments, battery slice 500 is operated in a constant current mode when the battery is empty, initially in order to charge battery cell 220. Once battery cell 220 reaches a certain threshold, for example a nominal charge voltage of about 4.1V, battery slice 500 is operated in a constant voltage mode. It should be understood that other nominal voltage may be used besides 4.1V in alternative embodiments. Input $I_{MAX}$ is used to limit the peak current through the switch elements.

In an embodiment, supply rail voltage $U_{RAIL}$ is used by calculation block 512 during the discharge mode to set supply rail voltage $U_{RAIL}$ to a particular voltage by adjusting the pulse width or on time of the pulse width modulated switching signals via feedback control. Similarly, battery cell 220 voltage $U_{BAT}$ is used by calculation block 512 during the charge mode to set battery cell 220 voltage $U_{BAT}$ to a particular voltage by adjusting the pulse width or on time of the pulse width modulated switching signals via feedback control. In one embodiment, supply rail voltage $U_{RAIL}$ is set to between about 5V and battery cell 220 voltage $U_{BAT}$ is set to between about 4.1 V and about 4.2 V. In alternative embodiments of the present invention, other voltages and voltage ranges may be used depending on the system and its particular specifications. When the system is operated in constant current mode, for example, when selected by the CV/CC signal, charging current signal $I_{CHG}$ is by calculation block 512 during the charging mode to set the charging current to a current represented by $I_{CHG}$ by adjusting the pulse width or on time of the pulse width modulated switching signals via feedback control. In some embodiments, the discharge current of the battery cell may also be similarly controlled.

In an embodiment, signal L is used by calculation block 512 to adjust the period $t_{PER}$ of oscillation and pulse width $t_{ON}$ of the switching signals according to a magnitude of inductor 218. In an embodiment, signal L is a digital word indicative of the inductance value of inductor 218. The use of this inductance value is explained below.

Comparator 524 compares voltage $U_{RAIL}$ with threshold voltage $U_{RAIL\_MIN}$. If comparator 524 determines that $U_{RAIL}$ is less than threshold $U_{RAIL\_MIN}$, DIS_EN is asserted via AND gate 512. A potentially running charging cycle is then completed until the inductor current is zero and subsequently a discharging cycle is performed. For a discharging cycle, the inductor is first pumped with switch 214 via output phase $\phi_0$ for the duration of $t_{ON}$ and then discharged with switches 210 and 212 via $\phi_1$ and $\phi_2$. Comparator 526 monitors battery voltage $U_{BAT}$ by comparing $U_{BAT}$ to threshold $U_{BAT\_MIN}$.

If $U_{BAT}$ is less than $U_{BAT\_MIN}$, CHG_EN is asserted via AND gate 520. A potentially running discharging cycle then is completed until the inductor current is zero and subsequently a charging cycle is performed. For a charging cycle, the inductor is first pumped with switches 210 and 212 via output phase $\phi_1$ and $\phi_2$ for the duration of $t_{ON}$ and then discharged into the battery cell with switch 214 and 212 via $\phi_0$. In embodiments of the present invention, particular voltages for $U_{RAIL\_MIN}$ (e.g. 4.75V) and $U_{BAT\_MIN}$ (e.g. 4.1V) are in accordance with the specifications and requirements of that particular system. For example, in one embodiment, $U_{RAIL\_MIN}$ may be set to be about 4.75 V, and $U_{BAT\_MIN}$ may be set to be about 4.1V. Alternatively, $U_{RAIL\_MIN}$ and $U_{BAT\_MIN}$ may be set to other voltages. Both charging and discharging may be disabled by setting PROT_n low.

Zero crossing detector 522 detects a zero crossing point of the measured current through resistor 216 (FIG. 5a), and may be used to control the switching of pulse width modulator block 516. Zero crossing detector 522 may also be used to operate battery slice 500 in a resonant mode or quasi-resonant conversion mode.

Oscillator 514 provides trigger signal TRG to pulse width modulation block 516. In an embodiment of the present invention, oscillator 514 provides a switching frequency of between about 20 kHz and about 500 kHz. Alternatively, other frequency ranges may be used depending on the particular application and its specifications.

FIG. 5c illustrates a waveform diagram illustrating the operation of battery slice 500 (FIG. 5a). When $U_{EXT}$ is greater than $U_{EXT\_MIN}$, the bi-directional power converter operates in a charging mode. Series switch control signal $\phi_1$ goes high whenever a rising edge of TRG occurs while CHG_EN is asserted, thereby charging inductor 218. When current $I_{BAT}$ reaches a maximum current $I_{PEAK}$, control signal $\phi_1$ goes low and low side transistor control signal $\phi_0$ goes high, thereby discharging inductor 218. Control signal $\phi_0$ remains high until signal ZXD indicates that $I_{BAT}$ has reached a zero crossing, at which time control signal $\phi_0$ goes low shutting off low side switching transistor 214. The cycle repeats again at the rising edge of TRG. In an embodiment, if TRG occurs before the zero crossing, $\phi_0$ goes low immediately and the cycle starts from the beginning.

When $U_{EXT}$ is less than $U_{EXT\_MIN}$, the power converter operates in a discharging mode. Low side switch control signal $\phi_0$ goes high whenever a rising edge of TRG occurs while DIS_EN is asserted, thereby charging inductor 218 in a direction opposite the charging direction in the charging mode. When current $I_{BAT}$ reaches a negative going maximum current $I_{PEAK}$, control signal $\phi_0$ goes low and series transistor control signal $\phi_2$ goes high, thereby discharging inductor 218. Control signal $\phi_2$ remains high until signal ZXD indicates that $I_{BAT}$ has reached a zero crossing, at which time control signal $\phi_2$ goes low shutting off series switching transistor 210. The cycle repeats again at the rising edge of TRG. In an embodiment, if TRG occurs before the zero crossing, $\phi_2$ goes low immediately and the cycle starts from the beginning.

Figure 6A:
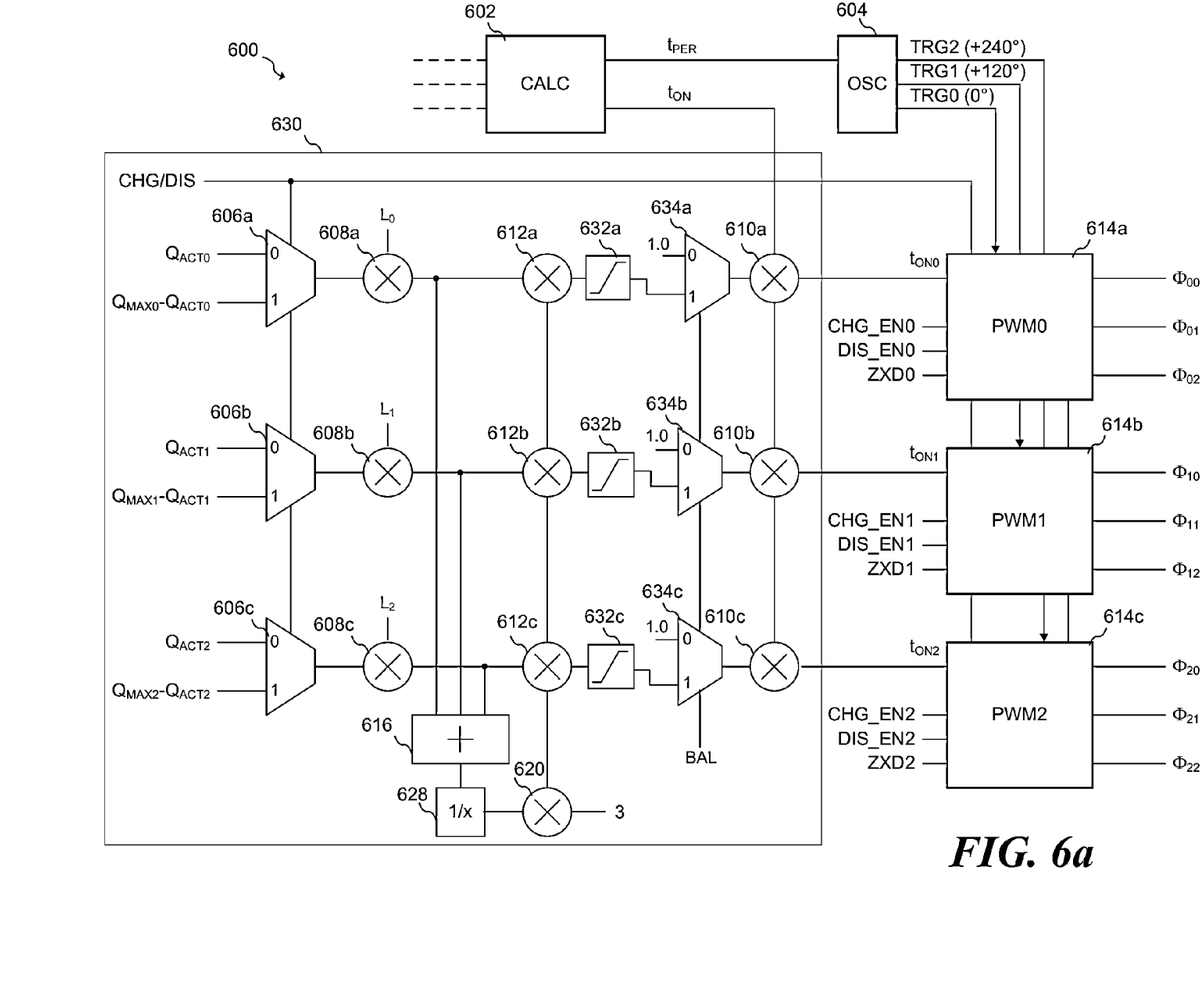
FIG. 6a-c illustrate schematics and a corresponding waveform diagram for an embodiment controller with an embodiment charge-balancing circuit.

FIG. 6a illustrates embodiment multi-slice battery management controller 600 that provides switch control signals for three bi-directional power supply slices. In an embodiment, calculation block 602 determines oscillation time period $t_{PER}$ for oscillator 604, and pulse width $t_{ON}$ for pulse width modulator's 614a, 614b, and 614c, each of which provides switch control signals to their respective bi-directional switched mode power converters as described above. Oscillator 604 provides phased output signals TRG0 at 0°, TRG1 at 120°, and TRG2 at 240°. It should be appreciated that a controller 600 may have any number of individual pulse width modulation blocks depending on the particular application and its specifications. In such embodiments, the phasing of the outputs of oscillator block 604 may be evenly distributed throughout a single period of oscillation. In an embodiment, signal TRG0 provides a trigger signal for pulse width modulator 614a, TRG1 provides a trigger signal for pulse width modulator 614b, and TRG2 provides a trigger signal for pulse width modulator 614c.

Figure 6B:
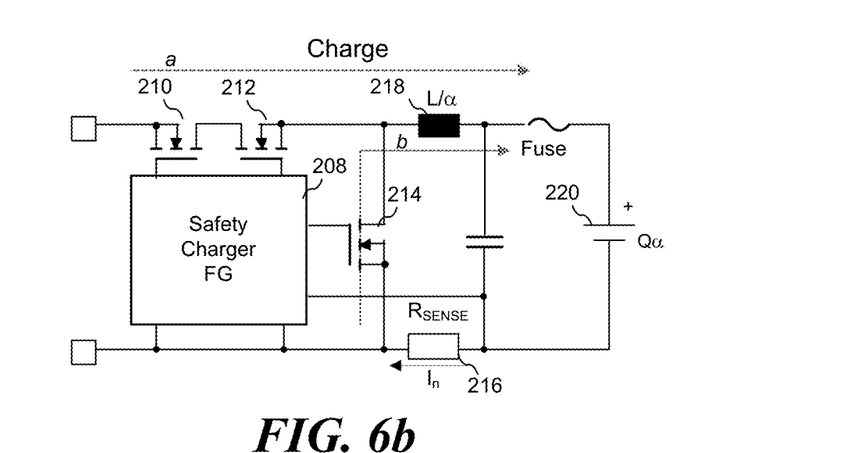
Figure 6C:
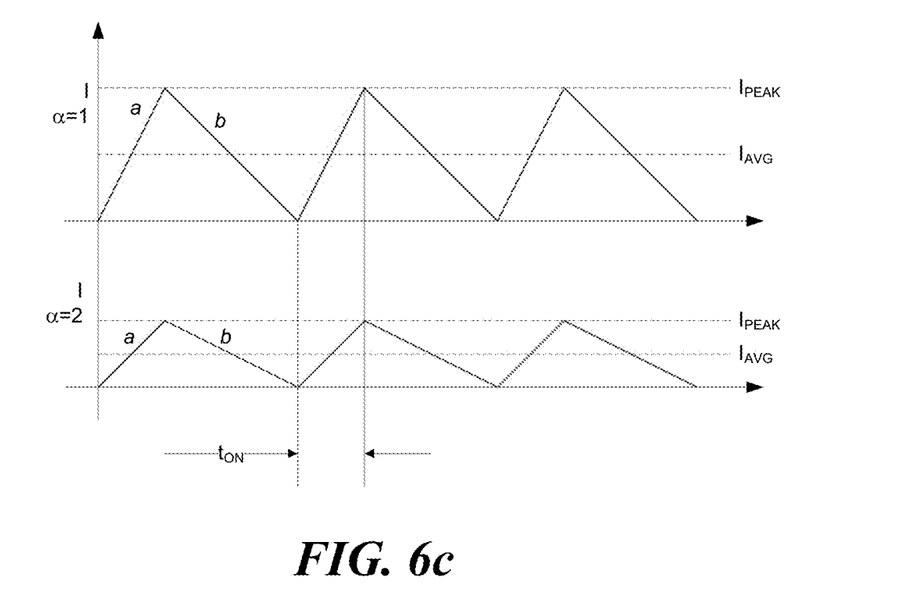

Charge balancing block 630 may be used to support batteries having different capacities. As such, charge may be balanced between two or more slices. Even if two batteries are initially configured to have the same capacity, production differences may cause differences in each battery's capacity. In an embodiment, a first level of charge balancing may be accomplished by the selection of inductor values. For example, a battery having a lower capacity may be coupled in series with an inductor having a higher inductance value in order to accommodate a similar pulse width emanating from its respective pulse width modulation block. This effect is illustrated by the circuit diagram of FIG. 6b and the waveform diagram of FIG. 6c. FIG. 6b shows battery cell 220 having a relative battery capacity of a, and inductor 218 scaled by the reciprocal of a. Current a flows though high side switches 210 and 212 and inductor 218 during a first phase, and current b flows through low side switch 214 during a second phase. It can be seen by the waveform diagram of FIG. 6c, that scaling the inductor to be inversely proportional to the charge capacity of a battery cell yields a similar $t_{ON}$ time.

The initial LQ product for each battery slice may be normalized by adjusting each respective inductor in each respective battery slice such that the LQ product for each battery slice is approximately the same. It should be understood, however, that in alternative embodiments of the present invention, different LQ products may also be used within the same system. The relative pulse width of a switch control signal for a particular battery slice may be further modified according to the measured charge of the respective battery cell or the remaining available capacity of the respective battery cell. For example, charge balancing may be used to both reduce the discharge rate of the battery having a lower remaining capacity while increasing the discharge rate of the remaining battery cells in order to maintain a constant discharge rate. In one embodiment, this may be accomplished for discharging by adjusting the pulse widths of a particular control signal based on an average value of remaining cell capacity times inductance value (instantaneous LQ product for discharging). In one embodiment, this may be accomplished during charging by adjusting the pulse widths of a particular control signal based on an average value of unused cell capacity times inductance value (instantaneous LQ product for charging).

Turning back to FIG. 6a, in an embodiment, charge balancing block 630 adjusts pulse width $t_{ON}$ produced by calculation block 602 to produce pulse width control signals $t_{ON0}$, $t_{ON1}$ and $t_{ON2}$ coupled to pulse width modulation blocks 614a, 614b and 614c, respectively. In an embodiment, pulse width control signal $t_{ON}$ is multiplied by a factor representing the product of a battery charge and inductance. For example, in the first channel during the discharge mode, $t_{ON}$ is multiplied by the product of QACT0, which represents the actual charge level remaining in the battery of the first slice, and L0 which represents the series inductance (for example inductor 218 in FIG. 5a) of the power converter. During the charging mode, L0 is multiplied by (QMAX0−QACT0), where QMAX0 represents the maximum capacity of the battery. Similar calculations are made in the second and third channel.

In an embodiment, the multiplexers 606a, 606b and 606c select between QACT and the difference between QMAX and QACT for each respective channel, power bus and multipliers 608a, 608b and 608c multiply the outputs of the multiplexers 606a, 606b and 606c with respective inductor values L0, L1 and L2. In an embodiment, inductor values L0, L1 and L2 may be digital values. An average instantaneous LQ product is summed using summer 616, a reciprocal is calculated using block 628 and multiplied by the number of channels (3 in this case) with multiplier 620 to form a charge balancing adjustment signal. The output of multiplier 620 is multiplied by each channel's instantaneous LQ product via multipliers 612a, 612b and 612c, the output of which is limited by limiters 632a, 632b and 632c to form a pulse width adjustment signal. Multiplexers 634a, 634b and 634c select the outputs of limiter 632a, 632b and 632c when signal BAL is asserted, indicating that charge balancing block 630 is active such that $t_{ON}$ is adjusted, or select a unity value when signal BAL is not asserted, indicating that charge balancing block 630 is inactive and $t_{ON}$ is left unadjusted. Multipliers 610a, 610b and 610c multiply the outputs of respective multiplexers 634a, 634b and 634c with $t_{ON}$ to form adjusted pulse width control signals $t_{ON0}$, $t_{ON1}$ and $t_{ON2}$. In some embodiments, BAL signal is not asserted during constant voltage charging mode such that charge control is performed by the CHG_EN signal.

In an embodiment, limiting blocks 632a, 632b and 632c ensures that the adjusted values of $t_{ON}$ stay within a nominal operating range under abnormal change conditions, for example: when one cell is empty and the other is full; when Q_ACT is close to zero for discharge conditions and close to one for charging conditions; or under some charge mismatch conditions. In an embodiment, the clipping limits of limiting blocks 632a, 632b and 632c are set to about 0.95 for the lower bound and about 1.05 for the upper bounds. Alternatively, other limits may be applied depending on the particular system and its requirements. In some embodiments, limiting blocks 632a, 632b and 632c may be omitted.

It should be understood that the implementation of charge balancing block 630 is just one example of a possible implementation. In alternative embodiments of the present invention, the various blocks within charge balancing block 630 may be implemented in a variety of different ways. For example, in one embodiment, multipliers, multiplexers patters and reciprocal blocks may be implemented using dedicated digital hardware such as digital multiplexers, digital multipliers and the like. Alternatively, these blocks may be implemented using a microcontroller or a digital signal processor. In further embodiments, the function of charge balancing block 630 may be implemented using analog signal processing techniques or combination of analog and digital signal processing techniques. Alternatively, other functionally equivalent structures may be used.

Figure 7:
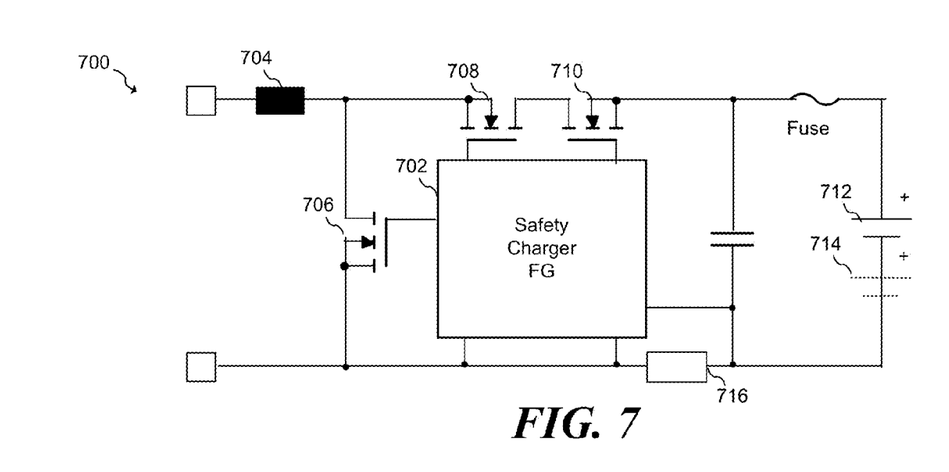
FIG. 7 illustrates a battery slice according to an alternative embodiment.

FIG. 7 illustrates battery cell slice 700 according to an alternative embodiment, which has series inductor 704 and low side switch 706 coupled on the opposite side of series switches 708 and 710 from battery cell 712. In some embodiments, optional series cell 714 or a further parallel cell (not shown) may be included. Controller 702 generates control signals for switches 706, 708 and 710 such that the bi-directional converter functions as a boost converter while charging cell 712 and as a buck converter while discharging cell 712. Battery slice 700 may be used as the slice architecture for embodiment battery management systems having multiple slices. Slice architecture 700 may be used in systems where rail voltages lower than the battery voltage are desired, or where the higher efficiency of a buck converter during discharge is desired.

Figure 8:
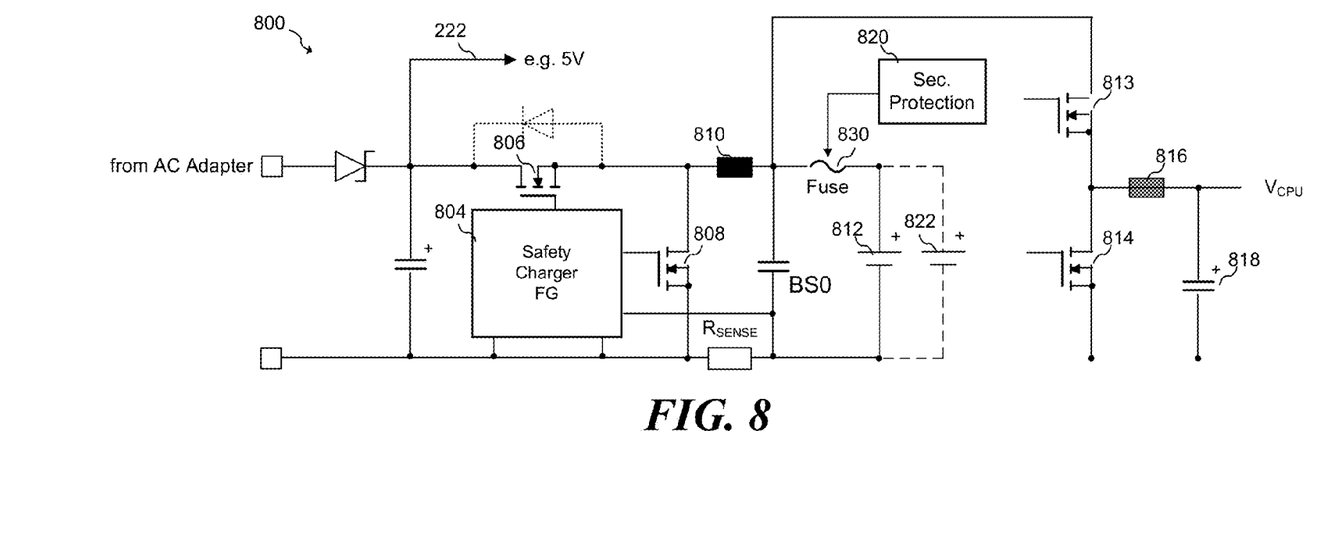
FIG. 8 illustrates a battery slice according to a further alternative embodiment.

FIG. 8 illustrates battery slice 800 according to a further alternative embodiment. Battery slice has series single switch 806, low side switch 808 and inductor 810 that are used for charging cell 812 from power bus 222. Optional parallel battery 822 may be included in some embodiments. An additional discharge path for cell 812 is provided using buck converter having switches 813, 814, inductor 816, and capacitor 818 to efficiently provide power directly to a load with high power consumption connected to bus $V_{CPU}$. Secondary protection block 820 senses safety related parameters of the battery cells 812 and 822, such as over voltage, over voltage and over temperature conditions, and blows fuse 830 in the event that these parameters indicate the onset of unsafe operation. In an embodiment, controller 804 generates switching signals that cause battery cell 812 to be both charged and discharged, as described above. Battery slice 800 may be used as the slice architecture for embodiment battery management systems having multiple slices. Slice architecture 800 may be used to provide power to low voltage power buses having a supply voltage less than the voltage of battery cell 812. For example, slice architecture may be used when battery cell 812 is a lithium-ion battery having a nominal charged voltage of between 3.6V and 3.7V and power bus $V_{CPU}$ supplies 1.8V or 1V logic.

In accordance with an embodiment, a bi-directional charging circuit has a battery coupling node output configured to be coupled to a battery cell, an input coupled to a common node of the battery management system, and a controller coupled to the bi-directional charging circuit. The controller is configured to operate the bi-directional charging circuit in a charging mode to transfer charge from the common node to the battery coupling node, and operate the bi-directional charging circuit in a discharge mode to transfer change from the battery coupling node to the common node.

In an embodiment, the bi-directional charging circuit includes a bi-directional buck-boost converter having a series switch, a parallel switch, and a series inductor. In some embodiments, the controller is configured to independently control an output voltage at the common node during the discharge mode, and independently control charging the bi-directional charging circuit during the charging mode.

In accordance with another embodiment, a battery management system includes a plurality of bi-directional charging circuits and a controller coupled to the plurality of bi-directional charging circuits. Each directional charging circuit has a respective battery coupling node output configured to be coupled to corresponding battery of the plurality of batteries, and an input coupled to a common node of the battery management system. The controller is configured to operate the plurality of bi-directional charging circuits in a charging mode to transfer charge from the common node to the respective battery coupling nodes, and operate the plurality of bi-directional charging circuits in a discharge mode to transfer charge from the respective battery coupling nodes to the common node.

In an embodiment, the plurality of bi-directional charging circuits are coupled in parallel. In some embodiments, each of the plurality of bi-directional charging circuits include a bi-directional buck-boost converter, such as a forward-buck-backward-boost converter. The charging circuits may include a series switch, a parallel switch, and a series inductor. The controller may be configured to the series switch to protect at least one of the plurality of batteries. In some embodiments the controller includes switching output coupled to switching inputs of the plurality of bi-directional charging circuits. The controller may activate the switching inputs of the plurality of bi-directional charging circuits in different phases. In some embodiments the different phases are evenly distributed throughout a period of oscillation. In an embodiment, each of the bi-directional charging circuits operates in a quasi-resonant conversion mode.

In an embodiment, the controller is configured to independently control an output voltage at the common node during the discharge mode, and the controller is configured to independently control charging of each of the bi-directional charging circuits during the charging mode. In an embodiment, the controller is configured to perform charge balancing of the plurality of batteries.

In accordance with a further embodiment, controller for a battery management system includes a plurality of pulse width modulator's, supply rail control circuit, and a plurality of battery charging control circuits. The plurality of pulse width modulator's are configured to be coupled to a corresponding plurality of per parallel bi-directional switching power supplies coupled between a supply rail and a corresponding plurality of batteries. Each of the plurality of pulse modulators has switching output configured to operate a corresponding bi-directional switching power supply in a charging mode and in a discharging mode the supply rail control circuit is configured to control a voltage of the supply rail during the charging mode. The plurality of battery charging control circuits is configured to control a charging voltage or a charging current to each of the corresponding plurality of batteries during the discharging mode.

In an embodiment, the controller also includes a charge balancing circuit configured to adjust the charging and discharging of each of the corresponding plurality of batteries according to a charge level of each of the corresponding plurality of batteries. In an embodiment, the charge balancing circuit adjusts a switch on time of each of the plurality of pulse modulators. During the charging mode, the charge balancing circuit may adjust the switch on time of a pulse modulator according to a difference between the maximum charge level and a remaining charge level of the corresponding battery. During the charging mode charge balancing circuit adjusts the switch on time of the pulse width modulator according to the remaining charge level of the corresponding battery.

In an embodiment, during the charging mode, the charge balancing circuit further adjusts the switch-on time of the pulse modulator according to a sum of a difference between a maximum charge level and a remaining charge level across each of the corresponding batteries. During the charging mode charge balancing circuit further adjusts the switch on time of the pulse modulator according to a sum of the remaining charge level across each of the corresponding batteries. In an embodiment, the controller is disposed on an integrated circuit. In some embodiments, the system includes the plurality of parallel bi-directional switching power supplies. The controller may be disposed within a battery management system of a mobile terminal in some embodiments.

In an embodiment, a method of operating a plurality of parallel connected bi-directional power supply circuits that are coupled to a corresponding battery into a common power node includes operating the plurality of bi-directional power supply circuits and a charging mode. Operating plurality of bi-directional power supply circuits in the charging mode includes switching switch signals coupled to the bi-directional power supply circuits to transfer charge from the common power supply node to each of the corresponding batteries. The method also includes operating the plurality of bi-directional power supply circuits in a discharge mode, which includes sequencing switch signals coupled to the bi-directional power supply circuits to transfer charge from each of the corresponding batteries to the common power supply node, and controlling the voltage at the common power supply node using feedback.

In an embodiment, operating the plurality of bi-directional switches in the discharge mode includes staggering phases of the switch signals of the bi-directional power supplies with respect to each other. Operating the plurality of bi-directional power supply circuits and the charging mode further includes independently adjusting the rate of charging of each bi-directional power supply circuit according to differences between a maximum charge level of each corresponding battery and an actual charge level of each corresponding battery.

In an embodiment, operating the plurality of bi-directional power supply circuits in the discharge mode further includes independently adjusting a rate of discharge of each bi-directional power supply circuit according to an actual charge level of each corresponding battery. In an embodiment, the method further includes performing charge balancing among the plurality of bi-directional power supply circuits. Performing charge balancing includes independently adjusting a charge rate and discharge rate of each individual bi-directional power supply circuit according to a ratio of charge remaining in the corresponding battery to a total charge remaining in all corresponding batteries.

Advantages of embodiments include the ability to implement a battery subsystem made of multiple cells having different capacities in various flexible configurations. For example, different slices may have a different number of battery cells coupled in parallel with each other. This may be advantageous battery systems that have a fixed amount of space in which to put battery cells. In one example, an entire battery space may be completely filled up by using an odd number of parallel battery cells, or a variety of different cells of different sizes. Each cell may be individually configured and the operation charge balanced in order to enhance the efficiency and capacity of each individual cell or each individual battery slice.

Another advantage of embodiments includes the ability to control the voltage of the output power supply bus. In some embodiments, controlling the voltage of the output power supply bus enables a more efficient system operation, especially in embodiments having linear regulators. This is particularly advantageous for embodiments used in mobile terminals with lower power supply bus voltages. Furthermore, lower power supply bus voltages allow for more efficient switch mode power supply conversion because of the lower up conversion and down conversion ratios. For example, in one embodiment, the power bus voltage may be controlled to be about 5V compared to 9V to 19V in conventional systems, which may be advantageous with respect to efficiency. It should be understood, however, that embodiments of the present invention may also be used to control a power bus voltage other voltages, such as 9V to 19V or even greater where appropriate.

Some embodiments of the present invention are particularly advantageous for low power applications including, but not limited to mobile terminals such as notebook computers, netbooks, ultrabooks, tablet computers that use lower distribution voltages. It should be appreciated that embodiments are not limited to low voltage, low power applications, and may also be directed toward other applications utilizing higher voltages and/or higher power.

A further advantage includes the ability to have a power supply rail voltage independent of battery voltage. An even further advantage includes a reduced number of switching elements and resistive elements in the power path. For example, switch 142 shown in FIG. 1b is not necessary in some embodiments.

In some embodiments, the above-mentioned advantages may result in increased efficiency, reduce complexity, reduce cost and prove scalability of embodiment battery management systems.

A further advantage includes the ability of the battery management system to remain operational even with the existence of defective battery cells and/or defective battery slices. Furthermore, in some embodiments, the charging algorithm may reside in the battery pack itself; therefore, no charger may be required on the host side, thereby leading to increased safety. For example, the charge in the battery pack may be programmed by the battery manufacturer and can therefore be more tailored to the battery cells than a generic charger in the host system. A further advantage includes lower electromagnetic interference (EMI) during charging due to the multiphase nature of the control signals for the battery slices.

Processes and related methods described herein to form a controller were described substantially employing analog and logic circuit components. It is contemplated within the broad scope of the present invention that some of the processes and related methods may be implemented using digital circuit techniques such as by employing a microcontroller or a digital signal processor.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A battery management system comprising:
   a plurality of bi-directional charging circuits coupled in parallel, each comprising:
      a respective battery coupling node output configured to be coupled to a corresponding battery of a plurality of batteries, and
      an input coupled to a common node of the battery management system;
   a charge balancing circuit; and
   a controller coupled to the plurality of bi-directional charging circuits, the controller configured to:
      operate the plurality of bi-directional charging circuits in a charging mode to transfer charge from the common node to the respective battery coupling nodes,
      operate the plurality of bi-directional charging circuits in a discharge mode to transfer change from the respective battery coupling nodes to the common node, wherein during the discharge mode the controller controls a respective contributed voltage at the common node to be different from a respective output voltage at the respective battery coupling nodes, independently for each one of the plurality of bi-directional charging circuits, and
      operate the charge balancing circuit to adjust the charging and discharging of each of the corresponding plurality of batteries according to a charge level of each of the corresponding plurality of batteries,
   wherein each of the plurality of bi-directional charging circuits comprises a bi-directional voltage converter, configured to convert an input voltage into a higher or lower output voltage in either direction, and
   wherein each of the plurality of bi-directional charging circuits comprises a series switch, a parallel switch, and a series inductor.

2. The battery management system of claim 1, wherein the bi-directional voltage converter is a buck-boost converter.

3. The battery management system of claim 1, wherein the controller is further configured to shut off the series switch to protect at least one of the plurality of batteries.

4. The battery management system of claim 1, wherein the controller comprises switching outputs coupled to switching inputs of the plurality of bi-directional charging circuits, and wherein the controller activates the switching inputs of the plurality of bi-directional charging circuits in different phases.

5. The battery management system of claim 1, wherein:
   the controller is configured to independently control an output voltage at the common node during the discharge mode; and
   the controller is configured to independently control charging of each of the bi-directional charging circuits during the charging mode.

6. The battery management system of claim 5, wherein the controller is configured to perform charge balancing of the plurality of batteries.

7. The battery management system of claim 1, wherein each of the bi-directional charging circuits operate in a quasi-resonant conversion mode.

8. A controller for a battery management system comprising:
   a plurality of pulse modulators configured to be coupled to a corresponding plurality of parallel bi-directional switching power supplies coupled between a supply rail and a corresponding plurality of batteries, each of the plurality of pulse modulators having switching outputs configured to operate a corresponding bi-directional switching power supply in a charging mode and in a discharging mode;
   a supply rail control circuit configured to control a voltage of the supply rail during the discharging mode, wherein controlling the voltage of the supply rail includes controlling each of the bi-directional switching power supplies to provide a respective contributing supply rail voltage sourced from a respective corresponding battery, wherein the respective contributing supply rail voltage of each switching power supply is different from a voltage available at the corresponding battery for each switching power supply;

a charge balancing circuit configured to adjust the charging and discharging of each of the corresponding plurality of batteries according to a charge level of each of the corresponding plurality of batteries; and a plurality of battery charging control circuits configured to control a charging voltage or charging current to each of the corresponding plurality of batteries during the charging mode, wherein each of the plurality of bi-directional switching power supplies comprises a bi-directional voltage converter, configured to convert an input voltage into a higher or lower output voltage in either direction, and wherein each of the plurality of bi-directional charging circuits comprises a series switch, a parallel switch, and a series inductor.

9. The controller of claim 8, wherein the charge balancing circuit adjusts a switch-on time of each of the plurality of pulse modulators.

10. The controller of claim 9, wherein:

during the charging mode, the charge balancing circuit adjusts the switch-on time of a pulse modulator according to a difference between a maximum charge level and a remaining charge level of the corresponding battery; and during the charging mode, the charge balancing circuit adjusts the switch-on time of the pulse modulator according to the remaining charge level of the corresponding battery.

11. The controller of claim 10, wherein:

during the charging mode, the charge balancing circuit further adjusts the switch-on time of a pulse modulator according to a sum of a difference between a maximum charge level and a remaining charge level across each of the corresponding batteries; and during the charging mode, the charge balancing circuit further adjusts the switch-on time of a pulse modulator according to a sum of the remaining charge level across each of the corresponding batteries.

12. The controller of claim 8, wherein the controller is disposed on an integrated circuit.

13. The controller of claim 8, further comprising the plurality of parallel bi-directional switching power supplies.

14. The controller of claim 13, wherein each of the plurality of parallel bi-directional switching power supplies comprise at least one switch and at least one inductor.

15. The controller of claim 8, wherein the controller further comprises switches of the parallel bi-directional switching power supplies.

16. The controller of claim 8, wherein the controller is disposed within a battery management system of a mobile terminal.

17. The controller for a battery management system of claim 8, wherein each of the bi-directional voltage converters comprises a bi-directional buck-boost converter.

18. A method of operating a plurality of parallel connected bi-directional power supply circuits that are each coupled to a corresponding battery and to a common power supply node, the method comprising:

operating the plurality of bi-directional power supply circuits in a charge mode, the operating the plurality of bi-directional power supply circuits in the charge mode comprising sequencing switch signals coupled to the bi-directional power supply circuits to transfer charge from the common power supply node to each of the corresponding batteries;

operating the plurality of bi-directional power supply circuits in a discharge mode, operating the plurality of bi-directional power supply circuits in the discharge mode comprising:

sequencing switch signals coupled to the bi-directional power supply circuits to transfer charge from each of the corresponding batteries to the common power supply node, and controlling a voltage at the common power supply node using feedback, wherein the voltage at the common power supply is controlled to be different from a voltage of each of the corresponding batteries; and charge balancing each of the corresponding batteries, the charge balancing comprising adjusting the charging and discharging of each of the corresponding batteries according to a charge level of each of the corresponding batteries, wherein each of the plurality of bi-directional power supply circuits comprises a bi-directional voltage converter, configured to convert an input voltage into a higher or lower output voltage in either direction, and wherein each of the plurality of bi-directional charging circuits comprises a series switch, a parallel switch, and a series inductor.

19. The method of claim 18, wherein:

operating the plurality of bi-directional power supply circuits in the discharge mode comprises staggering phases of the switch signals of the bi-directional power supplies with respect to each other.

20. The method of claim 18, wherein operating the plurality of bi-directional power supply circuits in the charging mode further comprises independently adjusting a rate of charging of each bi-directional power supply circuit according to a difference between a maximum charge level of each corresponding battery and an actual charge level of each corresponding battery.

21. The method of claim 18, wherein operating the plurality of bi-directional power supply circuits in the discharge mode further comprises independently adjusting a rate of discharge of each bi-directional power supply circuit according to an actual charge level of each corresponding battery.

22. The method of claim 19, further comprising performing charge balancing among the plurality of bi-directional power supply circuits, performing charge balancing comprising independently adjusting a charge rate and discharge rate of each individual bi-directional power supply circuit according to a ratio of a charge remaining in the corresponding battery to a total charge remaining in all corresponding batteries.

23. The method of claim 18, wherein each of the bi-directional voltage converters comprises a bi-directional buck-boost converter.

* * * * *